US009166684B2

(12) United States Patent
Pusarla et al.

(10) Patent No.: US 9,166,684 B2
(45) Date of Patent: *Oct. 20, 2015

(54) INTEGRATED COMMERCIAL COMMUNICATIONS NETWORK USING RADIO FREQUENCY AND FREE SPACE OPTICAL DATA COMMUNICATION (71) Applicant: AOptix Technologies, Inc., Campbell, CA (US)

(72) Inventors: Chandrasekhar Pusarla, San Jose, CA (US); Srinivas Sivaprakasam, Fremont, CA (US); Joseph Shiran, Palo Alto, CA (US); Malcolm J. Northcott, Felton, CA (US); J. Elon Graves, Los Gatos, CA (US); Howard Dando, Rio Del Mar, CA (US); Santanu Basu, Palo Alto, CA (US); Siegfried Fleischer, Campbell, CA (US)

(73) Assignee: Aoptix Technologies, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,672

(22) Filed: Dec. 12, 2014

(65) Prior Publication Data
US 2015/0098707 A1 Apr. 9, 2015

Related U.S. Application Data (63) Continuation of application No. 13/149,804, filed on May 31, 2011, now Pat. No. 8,942,562.

(51) Int. Cl.
H04J 14/02 (2006.01)
H04B 10/00 (2013.01)
H04B 10/112 (2013.01)

(52) U.S. Cl.
CPC .......... *H04B 10/112* (2013.01); *H04B 10/1121* (2013.01)

(58) Field of Classification Search
CPC .................................................. H04B 10/1121
USPC .................................... 398/79, 115, 118-131
See application file for complete search history.

(56) References Cited

U.S. PATENT DOCUMENTS 4,829,162 A * 5/1989 Soloski et al. ................. 219/522
4,866,732 A * 9/1989 Carey et al. ................... 375/141
(Continued)

FOREIGN PATENT DOCUMENTS

CN 101919183 A 12/2010
WO WO 2012166430 A1 * 12/2012

OTHER PUBLICATIONS

European Patent Office, Search Report and Opinion, European Patent Application No. 12792604.6, Mar. 23, 2015, six pages.
(Continued)

Primary Examiner — M. R. Sedighian
Assistant Examiner — Abbas H Alagheband
(74) Attorney, Agent, or Firm — Fenwick & West LLP (57) ABSTRACT A stabilized ultra-high bandwidth capacity transceiver system that combines an E-band (71-76 GHz, 81-86 GHz) millimeter wave RF transceiver with an eye-safe adaptive optics Free Space Optical (FSO) transceiver as a combined apparatus for simultaneous point-to-point commercial communications. The apparatus has a high degree of assured carrier availability under stressing environmental conditions. The apparatus establishes and maintains pointing and stabilization of mmW RF and FSO optical beams between adjacent line of sight apparatuses. The apparatus can rapidly acquire and reacquire the FSO optical carrier link in the event the optical carrier link is impaired due to adverse weather.

19 Claims, 5 Drawing Sheets

(56) References Cited

U.S. PATENT DOCUMENTS

| | | | |
|---|---|---|---|
| 6,763,195 B1* | 7/2004 | Willebrand et al. | 398/115 |
| 6,816,112 B1* | 11/2004 | Chethik | 342/357.31 |
| 7,095,957 B1 | 8/2006 | Britz et al. | |
| 7,194,159 B1* | 3/2007 | Graves | 385/31 |
| 8,923,701 B2* | 12/2014 | D'Errico et al. | 398/115 |
| 2002/0075542 A1* | 6/2002 | Kumar et al. | 359/135 |
| 2002/0122230 A1* | 9/2002 | Izadpanah et al. | 359/145 |
| 2002/0126967 A1* | 9/2002 | Panak et al. | 385/101 |
| 2002/0196506 A1* | 12/2002 | Graves et al. | 359/172 |
| 2003/0025631 A1* | 2/2003 | Kim | 342/198 |
| 2003/0163555 A1* | 8/2003 | Battou et al. | 709/223 |
| 2003/0231584 A1* | 12/2003 | Zeitfuss | 370/228 |
| 2004/0037566 A1* | 2/2004 | Willebrand et al. | 398/115 |
| 2004/0071470 A1* | 4/2004 | Neff et al. | 398/129 |
| 2004/0120717 A1* | 6/2004 | Clark et al. | 398/118 |
| 2004/0141753 A1* | 7/2004 | Andreu-von Euw et al. | 398/122 |
| 2005/0094718 A1* | 5/2005 | Pastemak et al. | 375/219 |
| 2005/0196166 A1* | 9/2005 | Wirth et al. | 398/33 |
| 2007/0031150 A1* | 2/2007 | Fisher et al. | 398/128 |
| 2007/0031151 A1* | 2/2007 | Cunningham et al. | 398/131 |
| 2007/0241886 A1* | 10/2007 | Breeding | 340/539.13 |
| 2008/0018855 A1* | 1/2008 | Larichev et al. | 351/211 |
| 2008/0044187 A1* | 2/2008 | Krill et al. | 398/121 |
| 2008/0153549 A1* | 6/2008 | Korevaar et al. | 455/561 |
| 2008/0207200 A1* | 8/2008 | Fein et al. | 455/426.1 |
| 2009/0002220 A1* | 1/2009 | Lovberg et al. | 342/33 |
| 2009/0184860 A1* | 7/2009 | Chan et al. | 342/21 |
| 2012/0068880 A1* | 3/2012 | Kullstam et al. | 342/54 |
| 2012/0220315 A1* | 8/2012 | Karttaavi et al. | 455/457 |

OTHER PUBLICATIONS

State Intellectual Property Office of the People's Republic of China, Office Action, Chinese Patent Application No. 201280038136.0, Aug. 12, 2015, six pages [with concise explanation of relevance in English].

* cited by examiner

INTEGRATED COMMERCIAL COMMUNICATIONS NETWORK USING RADIO FREQUENCY AND FREE SPACE OPTICAL DATA COMMUNICATION

CROSS REFERENCE TO RELATED APPLICATIONS

This application is a continuation of U.S. application Ser. No. 13/149,804, filed May 31, 2011, now issued as U.S. Pat. No. 8,942,562, which is incorporated by reference in its entirety.

BACKGROUND OF THE INVENTION

1. Field of the Invention

This application relates to both radio frequency as well as free space optical data communication, particularly E-band millimeter wave Radio Frequency data communication.

2. Description of the Related Arts

In 2003, the FCC-licensed for use 13 GHz of spectrum in the 70 GHz and 80 GHz bands, also known as the E-band millimeter wave Radio Frequency (RF) spectrum. Ten bands in this spectrum were made commercially available for a broad range of fixed wireless applications operating at gigabit data transfer rates. Applications include point-to-point local wireless networks and broadband internet access. Communication of data through E-band signals potentially serves as a cheap alternative to more costly fiber solutions, particularly in urban areas due to the cost of laying fiber. E-band RF data transfer is a particularly cost effective solution for filling the gap for short-haul wireless connectivity in the so-called "last mile" between network service providers and customers. E-band RF data transfer can also offer data rates that overlap with lower the end of rates available with fiber-based solutions.

Because of its location in the radio frequency spectrum (71-76 and 81-86 GHz), E-band data transmission is not very susceptible to interference due to fog, airborne particulates such as dust and atmospheric turbulence. E-band data transmission, however, is susceptible to degraded performance due to rain. Rain interferes with radio wave transmission in the E-band, such that during a rain storm, data transmission would necessitate repeated data retransmission at best or interrupted service at worst.

Radio waves in the E-band have a narrow, pencil beam-like characteristic, and as a result antennas producing E-band signals can be placed in close proximity to one another without concern for adjacent channel interference. However, due to the narrow pencil-like characteristic of the E-band RF beam, an E-band transmitter must be precisely pointed at its receiver in order to ensure data transmission. Twist and sway movements due to wind and other weather can more easily disrupt data transmission in the E-band versus data transmissions that occurs at lower frequencies.

SUMMARY OF THE INVENTION

To provide an integrated apparatus for free space data transmission, embodiments of the invention combine millimeter wave (mmW) Radio Frequency (RF) data transmission with Free Space Optical (FSO) data transmission on a common stabilized assembly. The apparatus may be used as part of a larger commercial communications network. The apparatus ensures high level of carrier availability, even under stressing environmental conditions. The apparatus further ensures that at least a mmW RF control link remains operational in the unlikely event that both rain and fog occur together.

Components of the apparatus include a mmW transceiver and a FSO transceiver. The transceivers are mounted on a stabilized mounting platform connected to a gimbal assembly inside a sheltered enclosure. The sheltered enclosure is mounted on a stationary platform, for example at a cell site or a network point of presence, and is positioned at a height above the ground in order to line up with an adjacent cell site that is located a distance away, but still within line-of-sight. In one embodiment, the sheltered enclosure also includes stationary equipment for supporting the stabilized mounting platform. The stationary equipment includes electronics for electrical power conditioning and distribution, as well as a drive controller for the gimbal assembly, and the bulk of the signal processing electronics. Electronics on the stabilized platform are minimized to reduce its power consumption and weight.

The gimbal assembly ensures that both the mmW RF antenna and the FSO transceivers are accurately pointed at an adjacent cell site containing the complement apparatus. Due to narrowness of both the mmW RF and FSO carrier beams, a high degree of stabilization is necessary for the moving platform. The gimbal assembly can correct for environmental effects that would otherwise disrupt communication by either of the transceivers (e.g., cell site vibration and sway). Coarse closed loop operation of the gimbal assembly is initially provided by the mmW RF transceiver, after which fine acquisition is performed by the FSO transceiver. The FSO transceiver includes fast steering mirror assembly that sends directional corrections to the gimbal assembly for pointing and stabilization of the transceivers.

In the unlikely event that both the RF and FSO carrier links are lost due to the simultaneous presence of both heavy rain and fog, the apparatus is capable of rapid reacquisition of a communications link. The apparatus uses a low data rate backchannel on the mmW RF carrier, which spreads a baseband carrier signal using a spread spectrum code, allowing for a much greater receiver sensitivity. This way, the mmW RF link is able to provide the gimbal assembly with at least the minimal amount of connectivity necessary to provide coarse control correction, even under inclement weather. This assists the FSO transceiver in reacquiring an optical link.

According to another embodiment, the FSO link may be configured to have a significantly higher data rate than the RF link. In this case, the apparatus is also capable of prioritizing the transmission of data. In one embodiment, when higher levels of throughput are available on the FSO link, higher priority data is transmitted by both transceivers, and lower priority data is transmitted only by the FSO transceiver. In another embodiment, if the RF and FSO links have similar data rates, then high priority data may be sent on both links, and low priority data may be split between the remaining RF and FSO data capacity.

In the event the transmission path is affected by rain, data transmission is minimally affected as the FSO transceiver is not significantly affected by rain. Conversely, if the transmission path is affected by fog or other particulate, data is also minimally affected as the mmW RF transceiver is not significantly affected by these weather conditions.

Other features and objectives of the present invention will be apparent from the following description and claims and are illustrated in the accompanying drawings, which by way of illustration, show preferred embodiments of the present invention and the principles thereof. Other embodiments of the invention embodying the same or equivalent principles may be used and structural changes may be made as desired by those skilled in the art without departing from the present invention or purview of the appended claims.

In one embodiment, the data transmitted by the transceivers incorporates data protection and loss mitigation techniques. In one embodiment, data to be transmitted may be preprocessed to incorporate forward error correction to improve robustness against packet loss. In one embodiment, packet retransmission can be used to recover data lost to momentary connection outages.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

General Overview and Benefits

An integrated communication apparatus may be used as part of a commercial communications network to facilitate the exchange of fully duplexed data with another similar device. The apparatus is configured to maintain high carrier availability, or uptime, even in adverse weather conditions. The apparatus includes two transceivers, a millimeter wave (mmW) Radio Frequency (RF) transceiver, and a Free Space Optical (FSO) transceiver. In one embodiment, the mmW RF transceiver operates in the E-band RF range, or 13 GHz of spectrum in the 70 GHz and 80 GHz radio frequency bands. In one embodiment, the mmW RF transceiver is capable of operating outside the E-band RF range. The mmW RF transceiver may be used to transmit data and/or establish a link with an adjacent apparatus. In another embodiment, the E-band RF electronics support both a high data rate waveform, and an additional low data rate waveform with at least 20 dB of improved sensitivity. The low data rate waveform is intended primarily to provide a very robust command and control backchannel, and to assist in initial link acquisition or link re-acquisition.

Benefits of the disclosed apparatus include enhancement of existing systems for commercial communications by augmenting presently available mmW RF systems which are subject to interruption from weather effects. The combination of mmW RF and FSO transceivers is complimentary, whereby the FSO supports connectivity during rain, which interrupts mmW RF transmission, and conversely the mmW RF supports connectivity during conditions where fog, snow, airborne particulate matter, and atmospheric turbulence interrupt the FSO.

Integrating a mmW RF transceiver with a FSO transceiver provides an alternative solution to ground-based fiber optic communication systems. Fiber systems are expensive to deploy, as there is significant cost associated with the trenching and laying fiber in urban areas. The integrated communication apparatus provides a lower cost alternative to building a fiber optic network.

As the apparatus incorporates two different transceivers, the apparatus is able to transmit data over more than one connection. This allows data of different priorities to be transmitted in the most efficient manner possible based on the weather conditions affecting the transceivers. The apparatus also resistant to malicious attempts to defeat or interrupt data delivery through jamming, interception or hacking, as data is capable of being transmitted over both RF and FSO transmission mediums.

System Structure

Figure 1:
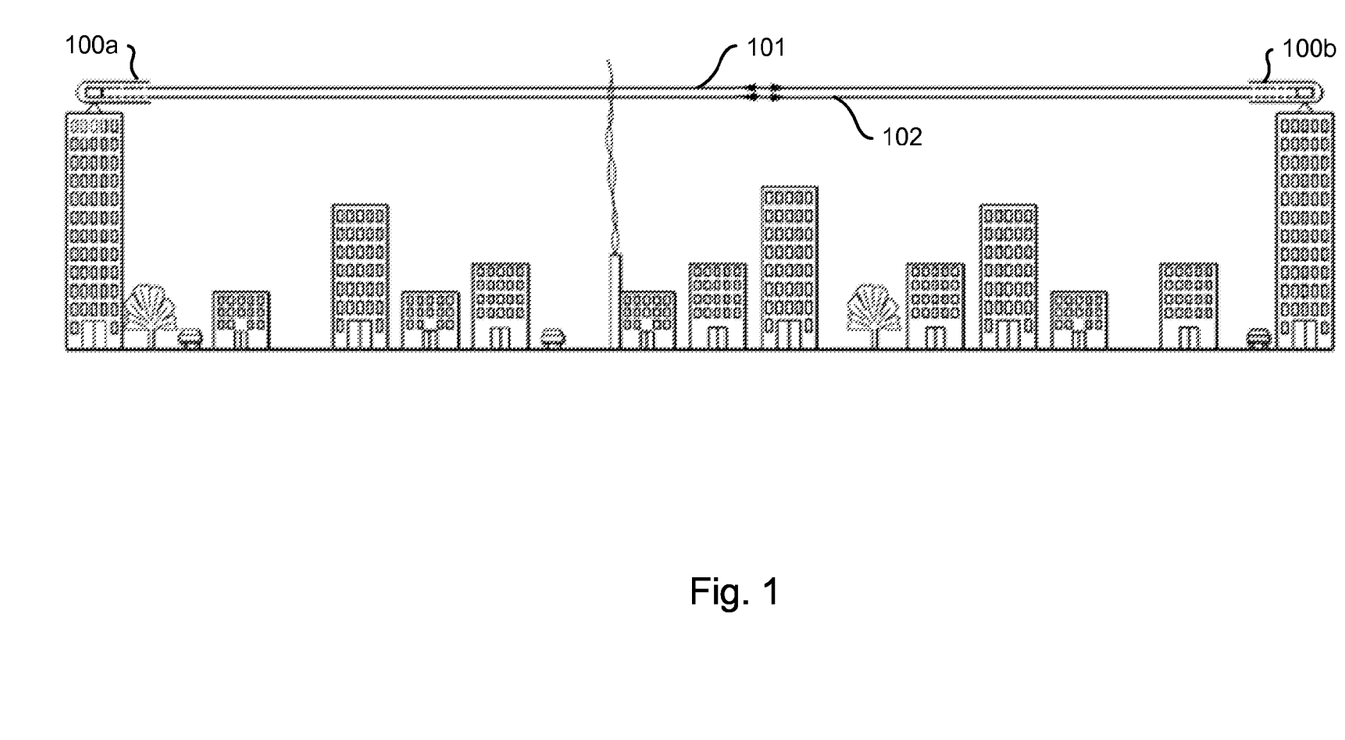
FIG. 1 is a system diagram of an integrated commercial communications network using two integrated communications apparatuses to communicate through free space.

FIG. 1 is a system diagram of an integrated commercial communications network using two integrated communications apparatuses to communicate through free space. An integrated communications apparatus 100a located at a first cell site is configured to communicate with another integrated communications apparatus 100b at a second cell site located remotely from the first cell site. The two apparatuses 100 do not have to be identical, so long as both devices are capable of transmitting and receiving both mmW RF 101 and FSO 102 transmissions at the relevant frequencies. The integrated communication apparatus 100 may be a stand-alone cell site, or attached to a cell site that performs other communications or network operations. The transceivers of the apparatus 100a are directed at another similar device 100b positioned a distance away within line of sight.

The distance between apparatuses may depend upon historical weather data for the area being serviced. For example, if the service area frequently experiences rain or fog, the distance between sites may be smaller than if these weather conditions are less frequent or severe. Often, an apparatus will be positioned at a prescribed height above ground to prevent interruption of line of sight due to building or landscape features. The apparatus may be land-based, maritime-based (i.e., mounted on a seaborne vessel), or airborne.

Figure 2:
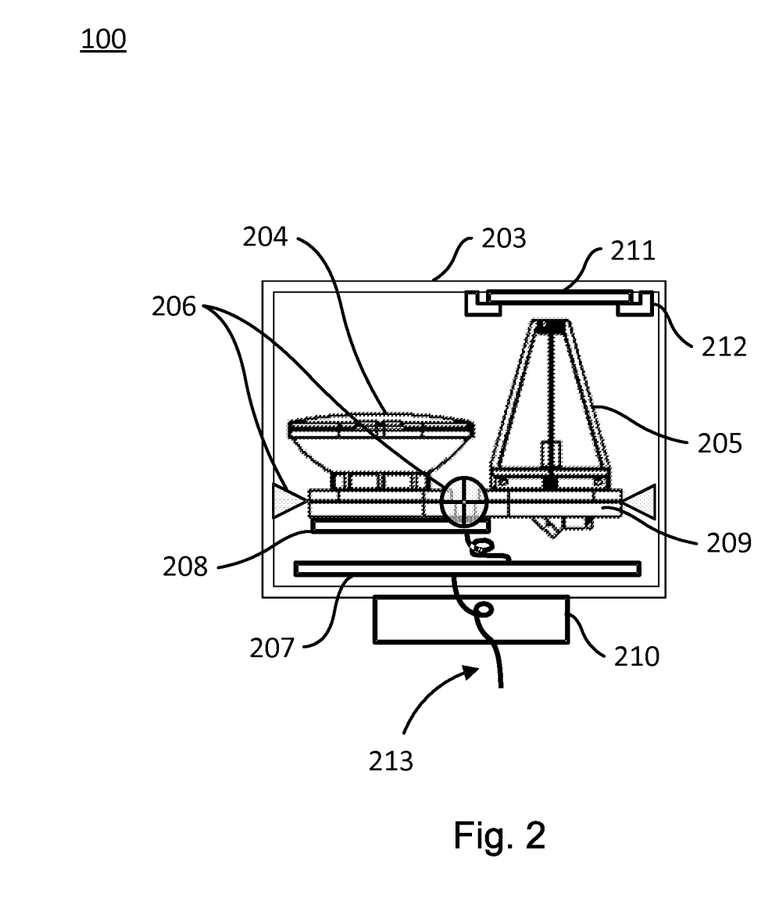
FIG. 2 is a side view of an integrated communications apparatus including an E-band mmW RF and a FSO transceiver, both mounted onto a gimbal-controlled platform, according to one embodiment.

FIG. 2 is a side view of an integrated communications apparatus including an E-band mmW RF and a FSO transceiver, both mounted onto a gimbal-controlled platform, according to one embodiment. The apparatus 100 includes an environmental enclosure 203. Inside the environmental enclosure 203, a mmW RF transceiver 204 and a FSO transceiver 205 are coupled to a gimbal assembly 206. In one embodiment, the gimbal assembly 206 is located external to the environmental enclosure 203.

In one embodiment, environmental enclosure 203 includes one or more apertures for transmitting signals. Each aperture is transparent to the transmissions at least one of the transceivers. In one embodiment, each aperture is constructed using a different material transparent to the transmissions of its associated transceiver. In one embodiment, the environmental enclosure 203 has a single common aperture, made of a material having qualities that allow propagation of both E-band mmW RF 101 and FSO 102 transmissions. In the example embodiment shown in FIG. 2, the apparatus 100 has only a single aperture 211. In this embodiment, the housing of the environmental enclosure 203 is substantially transparent to mmW RF transmissions 101. The aperture 211 for the FSO transceiver includes an optical window to FSO transmissions 102.

The environmental enclosure 203 provides protection against environmental deterioration or destruction for all internal electrical and mechanical components of the apparatus. In one embodiment, the environmental enclosure 203 may also provide for internal environment control of properties such as temperature, humidly, condensation, and moisture. The environmental enclosure 203 may also employ a heater, wiper, or other mechanism 212 to preclude or limit precipitation or ice formation on the aperture 211.

Both the mmW transceiver 204 and the FSO transceiver 205 are mounted on a moving platform 209. In one embodiment, the FSO transceiver 205 is mounted to an optical bench, and the optical bench is mounted on the movable platform 209. In one embodiment, the optical bench and moving platform 209 are identical. The moving platform 209 is connected to the environmental enclosure 203 through gimbal assembly 206. Gimbal assembly 206 allows the transceivers to rotate within a range of motion on two axes dimensions, in order to assist the transceivers in forming communications links with other similar devices. Through their common mounting on the moving platform 209, the motion of both is controlled by the gimbal assembly 206. The transceivers share a near-common boresight.

The environmental enclosure 203 also contains a stationary platform circuit board 207 and a moving platform circuit board 208 which together transmit, receive, and process data. The stationary platform circuit board 207 is located off of the moving platform 209, and thus does not move with gimbal 206 motion. The stationary platform circuit board 207 exchanges power and data with external electronics separate from the apparatus 100 through cables and/or fibers 213 that pass through a port 210 in the environmental enclosure 203.

The moving platform circuit board 208 is located on the moving platform. The moving platform circuit board 208 includes those electronics that are only able to function in close proximity to the transceivers, or are best able to function in close proximity to the transceivers. Generally, it is preferable to minimize the mass and heat loading of the gimbal assembly 206. Thus, electronics not required to be on the moving platform circuit board 208 are instead located on the stationary platform circuit board 207. Removing unnecessary electronics from the moving platform circuit board 208 has the added benefit of minimizing the thermal loading of the moving platform 209. In one embodiment, no electronics require close proximity to the transceivers, thus the moving platform circuit board 208 is omitted and all electronics for the apparatus are located on the stationary platform circuit board 207.

Data received at the transceivers is communicated to the moving platform circuit board 208, which may perform some data processing before sending the data to the stationary platform circuit board 207 for possible further processing. The stationary platform circuit board 207 sends the data to external electronics through cables 213.

Transceiver Structure and Signal Acquisition/Reacquisition

Figure 3:
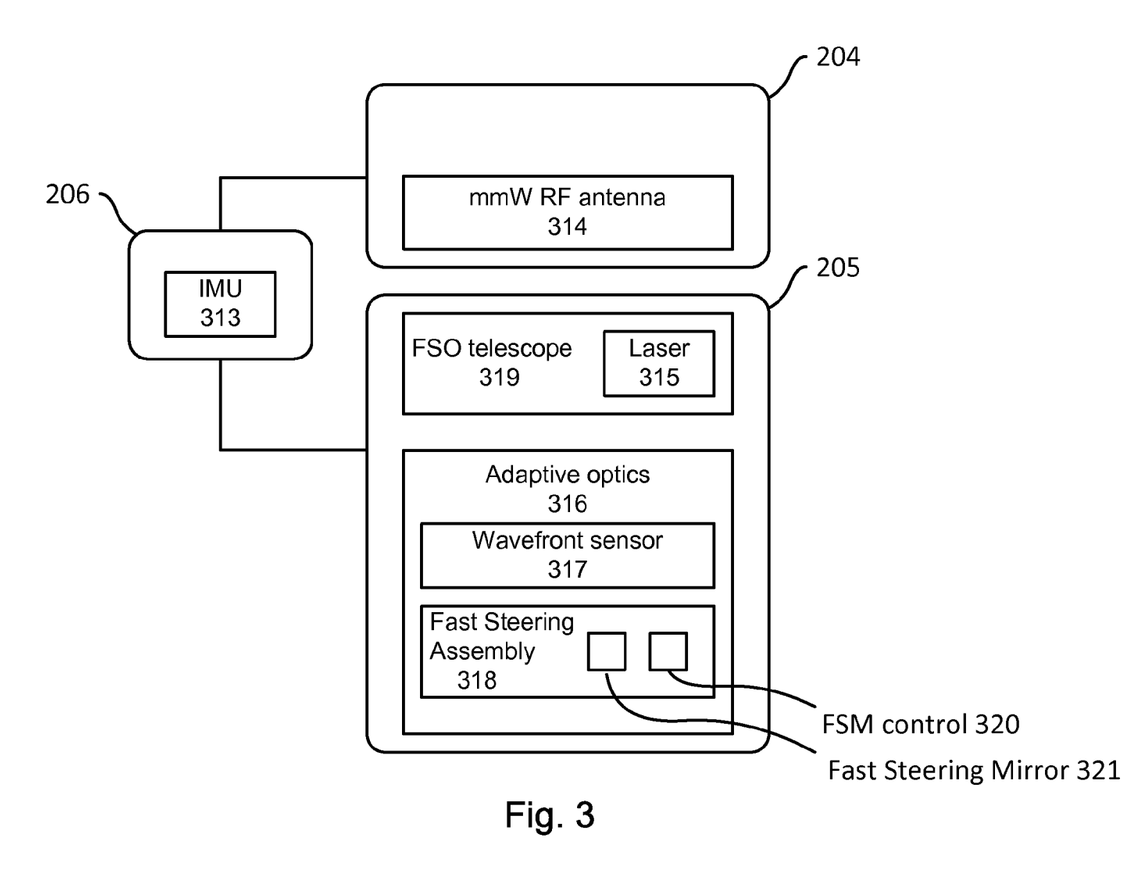
FIG. 3 is a diagram illustrating the components of the transceiver related to signal acquisition and reacquisition, according to one embodiment.

The transceivers 204 and 205 of the apparatus 100 work in conjunction with the gimbal assembly 206 to establish communications links for data transmission. FIG. 3 is a diagram illustrating the components of the transceivers related to signal acquisition and reacquisition, according to one embodiment. The mmW RF transceiver 204 includes a mmW RF antenna 314 for transmitting and receiving mmW RF transmissions. In one embodiment, the mmW RF antenna 314 is 0.3 meters in diameter, and has a field angle of approximately 0.9 degrees. The mmW RF antenna 314 is also used in coarse steering correction for the gimbal assembly 206.

The FSO transceiver 205 includes a FSO telescope 319. The FSO telescope consists of an FSO boresight. The FSO telescope 319 consists of a laser 315 for transmitting FSO transmissions. In one embodiment, the laser 315 consists of a fully duplexed eye-safe 1550 nm central wavelength laser carrier. The FSO transceiver 205 additionally includes adaptive optics 316. In one embodiment, the adaptive optics 316 include a wavefront sensor 317. The adaptive optics 316 can consist of a low order system providing wavefront tip-tilt correction only, or a high order system providing higher order wavefront aberration correction (e.g., focus and higher).

The adaptive optics 316 provides improved wavefront phase coherency for FSO transmissions, despite the presence of atmospheric turbulence. The adaptive optics 316 does this by providing for correction of both an inbound and/or outbound optical wavefront to improve the wavefront's optical point spread function, thereby maximizing the FSO transceiver carrier throughput. The adaptive optics 316 also measure the arriving optical wavefront and use the resulting measurements as data to determine how to best orient the movable platform 209 towards the adjacent apparatus. The adaptive optics 316 include fast steering assembly 318. The fast steering assembly 318 includes a fast steering mirror (FSM) 321 and a FSM control 320. In one embodiment, the FSM control 320 consists of a motor drive coupled to the movable platform 209.

The control system between the FSO transceiver 205 and the gimbal assembly 206 results in the transmission and reception of nearly collimated optical beams for establishing links and communicating data. As a result, the apparatus 100 is able to communicate FSO data over significantly larger distances than comparable FSO devices that must use divergent optical beams. In one embodiment, the FSO optical beam spreads over an angular range of less than one-tenth of a degree in any given direction. In one embodiment, the FSO has a link uptime of at least 99.9999% at a distance of four miles.

As both transceivers 204 and 205 share a common moving platform 209, both transceivers generally move together in response to gimbal 206 motion. However, in one embodiment the FSO transceiver 205 is independently steerable from the mmW RF transceiver 204 using the FSM 408. The wavefront sensor 317 measures the intensity conjugates of the arriving optical beam, and provides fine control data to the FSM control 320. The FSM control 320 uses the control data to move and/or rotate the FSM 321 in order to precisely position the FSO optical boresight independent of the motion of the movable platform 209. The FSO optical boresight is positioned to maximize the irradiance received at wavefront sensor 317 from an arriving optical beam.

Gimbal assembly 206 provides stabilization for the transceivers, and controls coarse and fine motion for the movable platform 209 containing the transceivers. The gimbal assembly 206 is coupled to the transceivers and uses received transmissions from remote cell sites to orient the movable platform 209 towards a remote apparatus in order to establish FSO and mmW communications links. The gimbal assembly 206 also responds to external weather influences that would affect the position and orientation of the movable platform 209. The gimbal assembly 206 includes an Inertial Measurement Unit (IMU) 313 which provides a local frame of reference for the position, velocity, and angular rotation of the gimbal assembly 206. The IMU 313 includes accelerometers and gyroscopes. Thus, the IMU is capable of detecting motion of the movable platform 209 due to external weather forces that cause apparatus motion, such as twist and sway.

Figure 4:
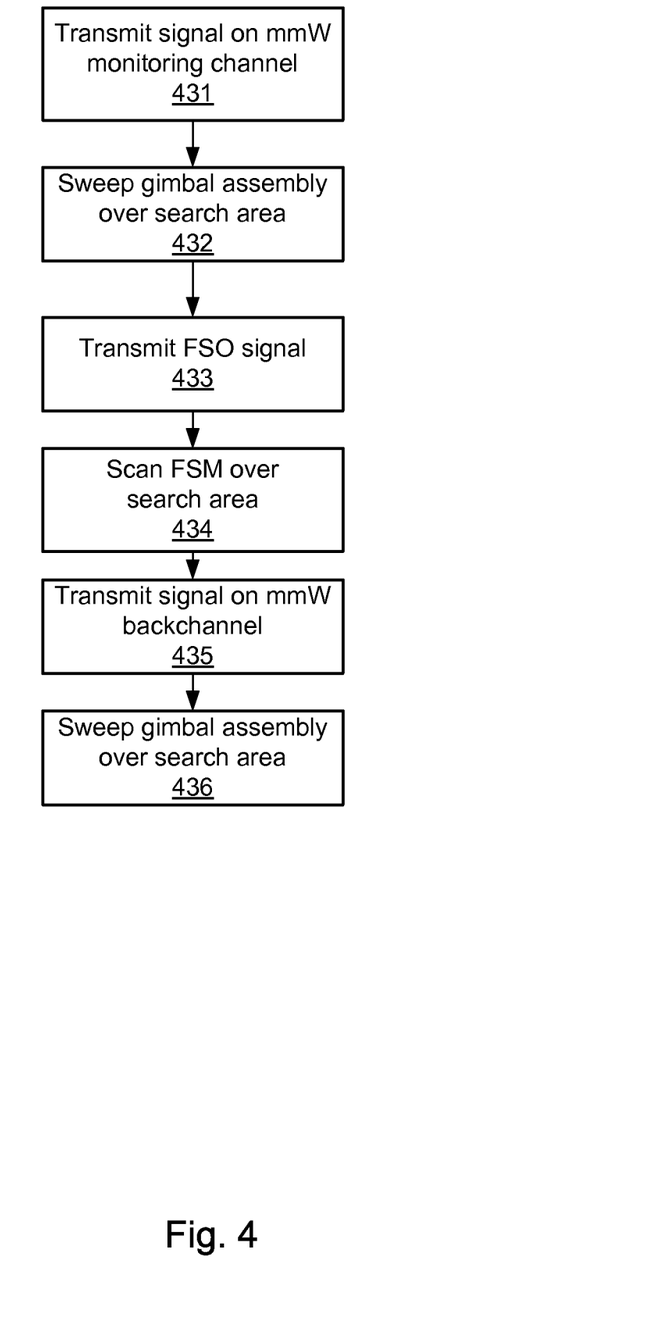
FIG. 4 is a flowchart illustrating the process for communications link acquisition and reacquisition by the integrated communications apparatus, according to one embodiment.

FIG. 4 is a flowchart illustrating the process for communications link acquisition and reacquisition by the integrated communications apparatus 100, according to one embodiment. Initially, apparatus at two cell sites are mechanically aligned 430 to point towards one another. In one embodiment, the mechanical alignment need only be performed once, upon initial installation of the apparatus.

The apparatus acquires an initial communications link with another remote apparatus by transmitting 431 a mmW RF signal on a mmW monitoring channel. For the mmW RF transceiver 204, "channels" represent specific time and radio frequency ranges that are recognized by the electronics of the apparatus 100 to perform specific purposes, such as data transfer or link acquisition/reacquisition. The monitoring channel may be a portion of the RF data channel, or alternatively the enhanced sensitivity back channel may also be used for this function.

While the mmW RF transceiver 204 transmits 431 a signal on the mmW monitoring channel, the gimbal assembly 206 sweeps 432 over a search area using a coordinated scanning technique. The coordinated scanning technique minimizes the search area scanned to find the remote apparatus. The goal of the transmission 431 is to detect the presence of another remote apparatus, through the reception of mmW RF transmissions from the remote apparatus.

The search area being scanned or swept by the gimbal assembly 206 converges based upon the distribution of mmW RF data being received from various volumes of scanned space. High amounts of received RF and FSO signal in a particular area are indicative of a apparatus in that area. The operation of the mmW RF transceiver 204 in conjunction with the gimbal assembly 206 to obtain an initial communications link may be referred to as "coarse correction" or "coarse control."

Concurrently with transmission 431 over the mmW monitoring channel, the FSO transceiver 205 may also transmit 433 a FSO signal. Typically, as the coordinated scanning technique focuses in on a remote apparatus, the FSO transceiver 205 will begin to receive incoming FSO transmissions from the remote apparatus at the wavefront sensor 317. A scanning technique is applied to the FSM control 320 to scan 434 the FSM 320 over a search area in order to more precisely located the remote apparatus. In one embodiment, a centroid algorithm is applied to the FSM control 320 to help the FSM mirror 321 better locate the remote apparatus. The FSM control 320 communicates with the gimbal assembly 206 to more precisely orient the movable platform 209 to maximize communication link strength. The operation of the FSO transceiver 205 in conjunction with the gimbal assembly 206 and the FSM control 320 to obtain a stronger communications link may be referred to as "fine correction or "fine control."

In the event that both transceivers lose connection with the remote apparatus, the mmW RF transceiver 204 transmits 435 a signal over a mmW backchannel to reacquire the communications link. The mmW backchannel is a low bandwidth mmW RF channel used to maintain coarse control of the gimbal assembly 206 when the FSO transceiver 205 cannot connect with its remote counterpart. The transmitted 435 mmW backchannel consists of a baseband signal using a spreading code, which spreads baseband signal over a low and wide frequency range, where the frequency range is low and wide relative to the frequency range of the mmW RF data channel. A baseband signal has a low frequency noise-like structure. By sequentially spreading the baseband signal structure over a wide band of low frequencies, a high degree of mitigation is achieved against natural fade-producing sources associated with atmospheric interference. This is due, in part, to the fact that atmospheric interference at the operating frequencies of the mmW RF transceiver looks like noise. In one embodiment, the baseband signal transmission includes data. In this embodiment, a received mmW RF baseband signal from an adjacent apparatus is processed by the apparatus 100 in order to recover transmitted data.

During reacquisition of the link by the FSO transceiver, the mmW RF transceiver 204 transmits 435 a signal on the mmW backchannel, the gimbal assembly 206 sweeps 436 over a search area. The apparatus 100 reduces the search area scanned using feedback provided by reception of RF transmissions from the remote apparatus over the mmW backchannel. The feedback functions to maintain coarse pointing control of gimbal assembly 206 while the FSO transceiver attempts to reacquire the optical link. Fine feedback is provided to the gimbal assembly 206 by data received at the FSO transceiver 205, In one embodiment, the apparatus also monitors the health of both mmW and FSO data links in real time over the mmW backchannel. In one embodiment, health monitoring also includes information regarding the real time status of the gimbal assembly 206. This information may be externally communicated to a user interested in monitoring the health of the communications network links. In one embodiment, the data signal sent over the backchannel from a first apparatus to a second apparatus provides control information for the intensity with which the second apparatus should transmit optical signals via the FSO transceiver from the second apparatus to the first apparatus. In this embodiment, the control information is based on the intensity of optical signals received at the FSO transceiver of the first apparatus.

Apparatus Electronics

Figure 5:
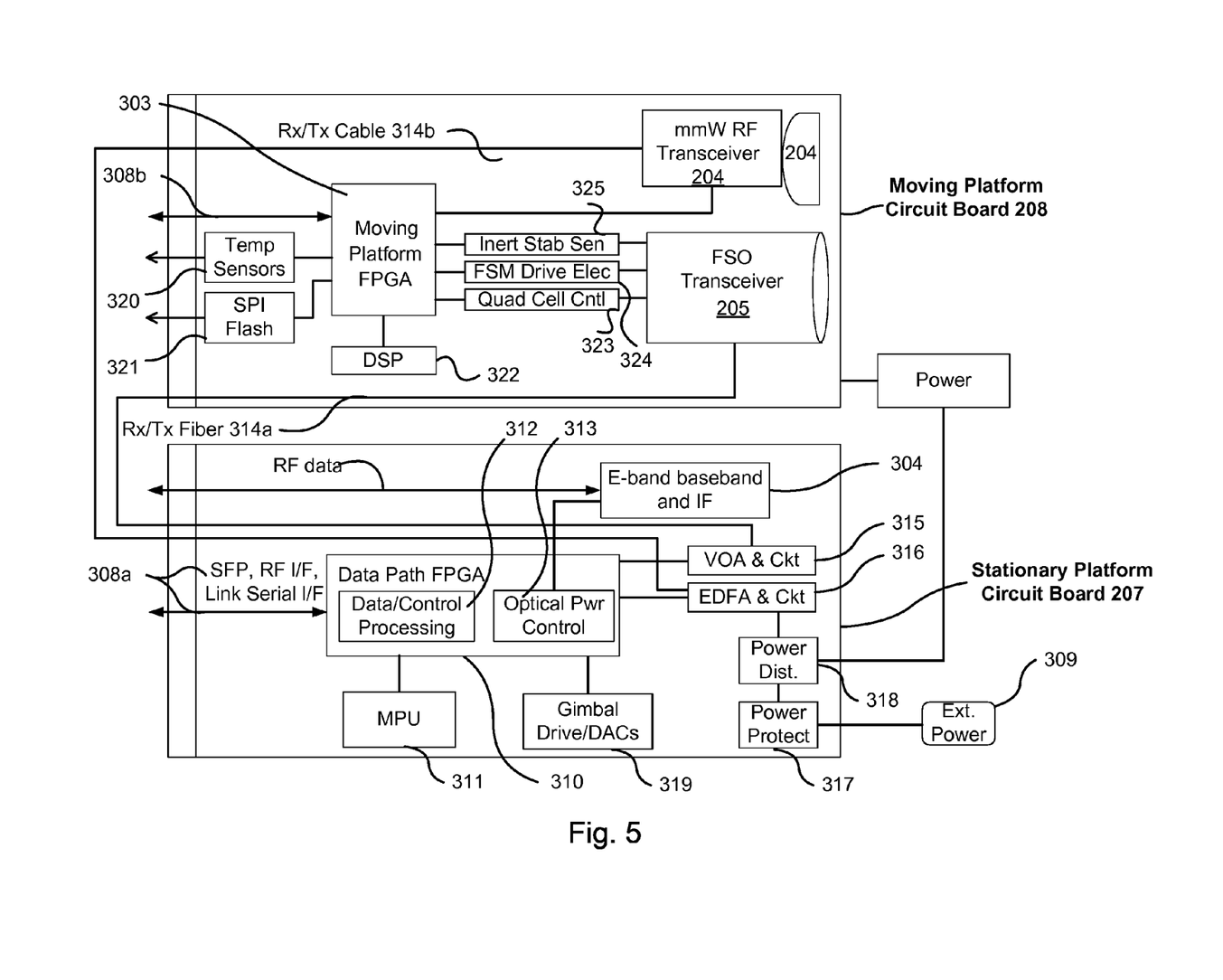
FIG. 5 is a block diagram of the electronics of the integrated communications apparatus, according to one embodiment.

FIG. 5 is a block diagram of the electronics of the integrated communications apparatus, according to one embodiment. Data is communicated within the apparatus 100 between the transceivers 204 and 205, through the electronics, and out to an external interface in either an electronic format, such as gigabit Ethernet format, or in an optical format. In one embodiment, the electronics of the apparatus 100 include a stationary platform circuit board 207 and a moving platform circuit board 208.

The stationary platform circuit board 207 may communicate between the moving platform circuit board 208 and with an external electronics interface associated with a user. External power 309 is received at the stationary platform circuit board 207 and is conditioned 317 and distributed 318 for use by the moving platform circuit board 208 or other components of the apparatus 100. In one embodiment, the stationary platform circuit board 207 also contains drive electronics (DACs) 319 for gimbal assembly 206, as well as drive electronics 319 for the fast steering mirror control 320 of the FSO transceiver 205.

In one embodiment, the stationary platform circuit board 207 includes a Data Path FPGA 310 that comprises logic for processing of transceiver data 312 and an optical power control 313. The Data Path Field Programmable Gate Array (FPGA) 310 may include or be attached to a microprocessor unit (MPU) 311. FPGA 310 interfaces to moving platform circuit board 208 with stationary platform circuit board 207 through link serial interconnects 308a and 308b. Interconnects 308 allow the stationary platform circuit board 207 to control operational functionality of transceivers 204 and 205. In one embodiment, the link serial interconnects 308 include interconnect 308c which provides coaxial functionality and incorporates E-band baseband and intermediate frequency (IF) electronics 304. E-baseband and IF electronics 304 ports RF data between moving platform and stationary circuit boards 207 and 208 in quadrature.

The stationary platform circuit board 207 may also include a variable optical attenuator (VOA) 315 to control the amplitude of the data received over optical fiber output 314a from the FSO transceiver 205. The stationary platform circuit board 207 also includes an Erbium Doped Fiber Amplifier (EDFA) 316 to control the amplitude of the data to be transmitted by the FSO transceiver 205. The EDFA may be followed by a VOA to allow rapid high accuracy control of the transmit power level. Data received (Rx) and transmitted (Tx) by the transceivers is transported to and from the moving platform circuit board 208 to the stationary platform circuit board 207 through connection 314. Connection 314 may be an electrical cable or optical fiber depending upon the embodiment. In one embodiment, the connection 314a with the FSO transceiver 205 comprises an optical fiber, whereas the connection 314b with the mmW RF transceiver 204 comprises a cable.

The moving platform circuit board 208 communicates data received at the transceivers 204 and 205 to the stationary platform circuit board 207, and may also communicate with an external interface. In one embodiment, the moving platform circuit board 208 consists of a FPGA 303. The moving platform FPGA 303 also includes a bi-directional external interface through link 308b. The moving platform 303 may include or be connected to a digital signal processor (DSP) 322. The moving platform FPGA 303 communicates with a temperature sensors 320 and serial peripheral interface (SPI) flash sensors 321, which output to an external interface. The moving platform FPGA 303 communicates with the FSO transceiver 205 through three sensors: an inertial stabilization sensor 325 capable of measuring the motion of the moving platform 209 to provide feedback to the gimbal assembly 206, a FSM drive electronics 324 coupled to the FSM control 320 for controlling the direction of the FSO transceiver 205, and a quadrature cell control electronics 323 for closed-loop optical beam stabilization.

Data Transmission

Both transceivers 204 and 205 of the apparatus 100 are capable of transmitting data at more than one data carrier rate, and may transmit over more than one channel at the same time. In one embodiment, the mmW RF transceiver 204 transmits data over several channels simultaneously using a phase shift keying digital modulation scheme. In one embodiment, the FSO transceiver 205 may transmit over multiple channels simultaneously using dense wavelength division multiplexing (DWDM).

The transceivers may employ forward error control correction (FEC) to an outbound data stream in order to reduce the need for retransmission of lost bits. The transceivers may also be configured to retransmit lost data in response to a retransmission signal received from the adjacent apparatus.

The apparatus 100 is capable of transmitting data of different priorities at different times and over different transceivers depending upon link conditions. In one embodiment, data is broken out into high priority data and low priority data.

In one embodiment, if both the FSO transceiver link and mmW RF transceiver link are active, both high and low priority data are transported by the FSO transceiver 205. Concurrently, only high priority data is also transmitted by the mmW RF transceiver 204. This redundancy reduces the need for retransmission of lost high priority data, thereby increasing the overall speed at which high priority data is transmitted. Low priority data, in contrast, is transmitted only by the FSO transceiver 205. The FSO transceiver 205 transmits both high and low priority data because it generally has a higher transmission capacity than the mmW RF transceiver 204.

In the event of rain, data transmitted by the mmW RF transceiver 204 may not be received, however data transmitted by the FSO transceiver 205 will be received. The FSO transceiver 205 does not experience performance degradation due to rain because the radius of raindrops is significantly larger than the wavelength of the FSO optical carrier allowing for less cross-sectional scattering of the propagated laser beam radiation. In the event of fog or other particulate-based weather events, data transmitted by the FSO transceiver 205 may not be received, however data transmitted by the mmW RF transceiver 204 will be received. FSO transceiver 205 emissions are susceptible to interference due to clouds, dense fog, snow, airborne volcanic particulates. Their radii are sufficiently small so as to permit cross-sectional scattering of the propagated FSO optical beam resulting in a loss of power at the receiving FSO aperture. The FSO beam may also be scattered by very strong atmospheric turbulence under some circumstances. In contrast, mmW RF radiation near the E-band is larger in wavelength than these particulates, and thus is not affected by them. The E-Band wavelength is also much larger than any perturbation that can be introduced buy atmospheric turbulence, and is therefore not effected by turbulence. Thus, the apparatus 100 is able to transmit data over at least one connection under a range of different adverse weather conditions. In one embodiment, as high priority data is transmitted over both transceivers, high priority data will be received by a remote apparatus even under the above described weather conditions.

In the event that the communications link has unused available transmission bandwidth, low priority data may be transmitted as high priority data in order to ensure maximum use of available transmission capacity and to minimize delays due to transmission time.

Additional Considerations

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus disclosed herein without departing from the spirit and scope of the invention as defined in the appended claims. Therefore, the scope of the invention should be determined by the appended claims and their legal equivalents.

What is claimed is:

1. An integrated apparatus for free space data transmission comprising:
   an E-band millimeter wave (mmW) Radio Frequency (RF) transceiver comprising an RF antenna emitting an RF beam comprising a frequency of at least 71 GHz, the RF beam configured to locate a remote apparatus, assist in coarse control, and send data to the remote apparatus, the RF antenna configured to receive a received RF beam from the remote apparatus;
   a free space optical (FSO) transceiver comprising an optical source emitting an optical beam through a FSO telescope configured to assist in fine orientation control and send data to the remote apparatus, the FSO telescope configured to receive a received optical beam from the remote apparatus, the optical beam pointed in substantially the same direction as the RF beam, the RF antenna and the FSO telescope having physically separate transmission axes located a distance greater than zero centimeters apart;
   at least one steering assembly that steers the RF beam and the FSO beam towards the remote apparatus;
   a controller configured to perform coarse orientation control of the steering assembly based on the received RF beam, and to perform fine orientation control of the steering assembly based on the received optical beam.

2. The integrated apparatus of claim 1 wherein the at least one steering assembly comprises a common moving platform connected to both the RF transceiver and the FSO transceiver, the common moving platform causing the RF beam and the FSO beam to both be commonly steered towards the remote apparatus.

3. The integrated apparatus of claim 1
wherein the at least one steering assembly comprises a first steering assembly for the RF transceiver, and a second steering assembly for the FSO transceiver, the first and second steering assemblies being independently steerable from each other; and
wherein to steer the RF beam and the FSO beam towards the remote apparatus the first and second steering assemblies are both separately steered to orient the RF beam and the FSO beam at a same angle.

4. The integrated apparatus of claim 1 wherein the RF beam provides control information for a transmit intensity of an optical signal transmitted by the remote apparatus, the control information based on an intensity of the received optical beam.

5. The integrated apparatus of claim 1 wherein the optical beam transmitted by the FSO transceiver is substantially collimated.

6. The integrated apparatus of claim 1 wherein the FSO transceiver comprises an adaptive optics system to partially correct received and transmitted optical wavefronts.

7. The integrated apparatus of claim 6 wherein the adaptive optics comprises a wavefront sensor to measure wavefront error, including tip-tilt.

8. The integrated apparatus of claim 1 wherein the FSO transceiver transmits data over a plurality of channels using dense wavelength division multiplexing (DWDM).

9. The integrated apparatus of claim 1 wherein both the RF transceiver and the FSO transceiver are capable of operating at a plurality of data carrier rates.

10. The integrated apparatus of claim 1 comprising a movable platform coupling the mmW RF transceiver and the FSO transceiver, and wherein the at least one steering assembly is a gimbal assembly.

11. The integrated apparatus of claim 1 comprising an environmental enclosure including the mmW RF transceiver, the FSO transceiver, the steering assembly, and an aperture aligned with the FSO transceiver to permit data transmission.

12. The integrated apparatus of claim 11 wherein the aperture of the environmental enclosure comprises an optical window transparent to the transmissions of the FSO transceiver and a heater to prevent condensation on the optical window.

13. The integrated apparatus of claim 1
wherein the integrated apparatus is installed at a first cell site or a network point of presence; and
wherein the remote apparatus is installed at a second cell site or a network point of presence that is physically remote from the first cell site.

14. A method for maintaining a communications link with a remote apparatus comprising:
transmitting a radio frequency (RF) beam from an RF antenna of an E-band millimeter wave (mmW) (RF) transceiver, the RF beam comprising a frequency of at least 71 GHz;
receiving an E-band RF response beam at the RF antenna;
adjusting an orientation of at least one steering assembly based on the E-band RF response beam, the at least one steering assembly steering the E-band mmW RF transceiver and a Free Space Optical (FSO) transceiver towards the remote apparatus;
transmitting a free space optical (FSO) beam from a FSO telescope of the FSO transceiver, the RF antenna and the FSO telescope having physically separate transmission axes located a distance greater than zero centimeters apart
receiving an FSO response beam at the FSO telescope; and
adjusting the orientation of the at least one steering assembly based on the FSO response beam.

15. The method of claim 14 wherein the at least one steering assembly comprises a common moving platform connected to both the RF transceiver and the FSO transceiver, the common moving platform causing the RF transceiver and the FSO transceiver to both be steered towards the remote apparatus.

16. The method of claim 14 wherein the at least one steering assembly comprises a first steering assembly for the RF transceiver, and a second steering assembly for the FSO transceiver, the first and second steering assemblies being independently steerable from each other; and
wherein to steer the RF antenna and the FSO telescope towards the remote apparatus the first and second steering assemblies are both steered a same direction.

17. The method of claim 14, wherein adjusting the orientation of the at least one steering assembly based on the FSO response signal comprises applying a centroid algorithm to the FSO response signal.

18. The method of claim 14, wherein adjusting the orientation of the steering assembly based on the FSO response signal comprises:
measuring a wavefront of the FSO response signal using a wavefront sensor, the wavefront comprising a tip-tilt component;
controlling a fast steering mirror (FSM) and the at least one steering assembly using the tip-tilt component of the wavefront.

19. The method of claim 18, further comprising controlling a deformable mirror using the wavefront.

* * * * *